Oct. 10, 1961   E. OLSON   3,003,238
LAWN EDGER
Filed Aug. 19, 1960
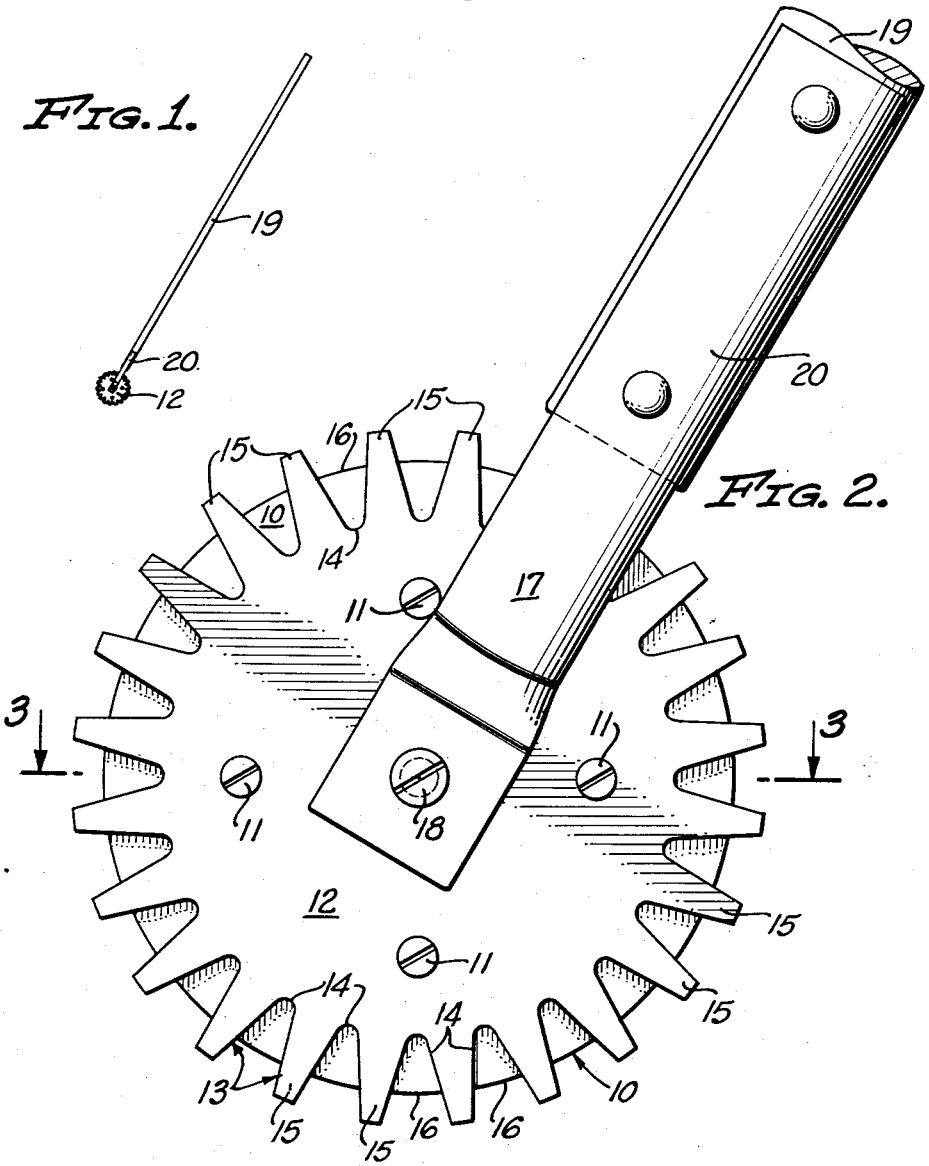
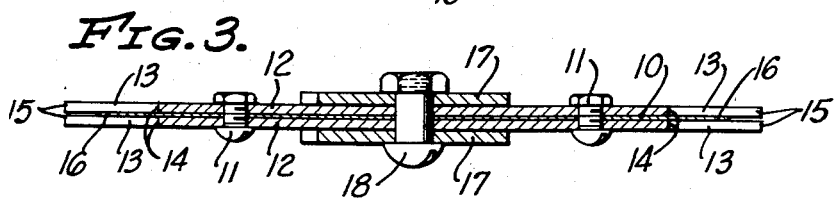
INVENTOR.
EMIL OLSON
BY Robert C. Comstock
ATTORNEY

3,003,238
LAWN EDGER
Emil Olson, 4220 Arlington Ave., Los Angeles, Calif.
Filed Aug. 19, 1960, Ser. No. 50,780
3 Claims. (Cl. 30—319)

This invention relates to a lawn edger.

It is an object of my invention to provide a lawn edger which is an improvement over devices of this type which are now in use in that it requires much less physical effort to operate and is faster as well. Many conventional types of lawn edgers have parts which must be pressed down into the lawn and then pushed through the dirt and grass roots much in the manner of a plow. With my invention, the ground engaging members are rotated rather than pushed and the degree of earth penetration which is required is reduced.

It is a further object of my invention to provide a lawn edger which is self-sharpening in that the blade is so extremely thin that the abrasive action of sand and dirt against the exposed edge portions of the cutting blade during use of the edger will continuously sharpen these operating portions of the blade.

It is another object of my invention to provide a lawn edger which in use does not form an undesirable wide groove or furrow along the edge of the lawn.

Another object of my invention is to provide a lawn edger which is capable of working forward and backward and which can be used with the right or left hand.

It is also among the objects of my invention to provide a lawn edger which is simple and economical to manufacture and which is long lasting in use, with wear being virtually eliminated.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings,

FIG. 1 is a side elevational view of my lawn edger;

FIG. 2 is an enlarged side elevational view of the cutting blade assembly;

FIG. 3 is a sectional view of the cutting blade assembly, taken along line 3—3 of FIG. 2.

A preferred embodiment which has been selected to illustrate my invention comprises an extremely thin circular cutting blade 10, which is preferably formed of heat treated spring steel having a thickness of approximately .012 inch. The edge of the blade 10 need not be sharpened during manufacture of the edger or at any time during its use.

The blade 10 is fixedly mounted between a pair of identically formed circular guard plates 12 by a plurality of fastening members 11. Each of the guard plates 12 is provided with a plurality of spaced teeth 13, which extend continuously around the entire peripheries of the guard plates 12, with adjacent pairs of teeth 13 being spaced by grooves 14. The flat outer ends 15 of the teeth 13 protrude radially outwardly beyond the peripheral edge of the blade 10, while the inner ends of the grooves 14 are disposed radially inwardly from the peripheral edge of the blade 10.

The teeth 13 of the guard plates 12 are aligned with each other so that only spaced cutting portions 16 of the peripheral edge of the cutting blade 10 are exposed between the spaced teeth 13 of the guard plates 12. The peripheral edge of the device thus comprises a continuous series of teeth 13 alternating with grooves 14, within which there are exposed arcuate cutting portions 16 of the edge of the blade 10.

A mounting member 17 is bifurcated at its lower end to fit on opposite sides of the guard plates 12. A bolt 18 extends through aligned central openings in the two sides of the mounting member 17, the guard plates 12 and the blade 10 to mount the guard plates 12 and blade 10 for rotation with respect to the mounting member 17. A sleeve 20 holds the opposite end of the mounting member 17 and the lower end of an elongated wooden handle 19.

In use, downward pressure is exerted upon the cutting blade assembly by means of the handle 19 to move the outer ends 15 of the teeth 13 into the ground to bring the cutting portions 16 of the blade 10 into engagement with the grass or other ground cover to be cut. Forward pressure exerted through the handle 19 will then cause the guard plates 12 and blade 10 to rotate and move along the edge of the lawn as guided by the user. Only a small amount of pressure and effort is required on the part of the user to guide and operate my lawn edger. Since the edger rotates substantially on top of the ground instead of being pushed through it, it requires less effort to operate and does not create a furrow as it is used.

Because of the extreme thinness of the cutting blade 10, it does not have to be sharpened initially and the abrasive action of the sand and dirt moving past the sides of the cutting portion 16 tend to maintain the sharpness of their cutting edges.

I claim:

1. A lawn edger comprising a circular steel cutting blade having a thickness of approximately .01 inch, a pair of flat substantially rigid circular metal guard plates attached to said blade on opposite sides thereof, each of said guard plates having a series of teeth spaced continuously around its periphery, the teeth of said guard plates being aligned with each other, said teeth having their outer ends disposed outwardly beyond the periphery of said blade and their inner ends disposed inwardly from the periphery of said blade to expose an arcuate portion of the circumference of said blade between each adjacent pair of teeth, and an elongated handle, said blade and guard plates being rotatably mounted on one end of said handle.

2. A lawn edger comprising an extremely thin circular metal cutting blade, a pair of circular metal guard plates mounted on opposite sides of said blade, said guard plates being fixedly attached to said blade and to each other, each of said guard plates being flat and substantially rigid, each of said guard plates having a series of teeth spaced continuously around its periphery, the teeth of said guard plates being aligned with each other, said teeth having their outer ends disposed outwardly beyond the periphery of said blade and their inner ends disposed inwardly from the periphery of said blade to expose an arcuate portion of the circumference of said blade between each adjacent pair of teeth, and an elongated handle, said blade and guard plates being rotatably mounted on one end of said handle.

3. A lawn edger comprising a thin circular metal cutting blade, a pair of substantially rigid circular guard plates fixedly mounted on opposite sides of said blade, each of said guard plates having a series of teeth placed continuously around its periphery, the teeth of said guard plates being aligned with each other, said teeth having their outer ends disposed outwardly beyond the periphery of said blade and their inner ends disposed inwardly from the periphery of said blade to expose an arcuate portion of the circumference of said blade between each adjacent pair of teeth, and an elongated handle, said blade and guard plates being rotatably mounted on one end of said handle.

References Cited in the file of this patent

UNITED STATES PATENTS

| | | |
|---|---|---|
| 594,776 | Burnham | Nov. 30, 1897 |
| 900,300 | Nicolas | Oct. 16, 1908 |
| 1,864,658 | McConnell | June 28, 1932 |
| 2,736,092 | Joyet | Feb. 28, 1956 |